US009559462B1

(12) United States Patent
Mosholder

(10) Patent No.: US 9,559,462 B1
(45) Date of Patent: Jan. 31, 2017

(54) PORT CONNECTOR SECUREMENT DEVICE

(71) Applicant: National Security Agency, Ft. Geroge G. Meade, MD (US)

(72) Inventor: Gary S. Mosholder, Sykesville, MD (US)

( * ) Notice: Subject to any disclaimer, the term of this patent is extended or adjusted under 35 U.S.C. 154(b) by 502 days.

(21) Appl. No.: 13/987,250

(22) Filed: Jan. 15, 2014

(51) Int. Cl.
*F16L 3/08* (2006.01)
*H01R 13/639* (2006.01)
*H01R 24/64* (2011.01)
*H01R 107/00* (2006.01)

(52) U.S. Cl.
CPC ............ *H01R 13/639* (2013.01); *H01R 24/64* (2013.01); *H01R 2107/00* (2013.01)

(58) Field of Classification Search
CPC .... H01R 24/64; H01R 13/639; H01R 2107/00
See application file for complete search history.

(56) References Cited

U.S. PATENT DOCUMENTS

| | | | | |
|---|---|---|---|---|
| 1,677,622 A * | 7/1928 | Dreuil | H01R 13/631 | 439/483 |
| 3,997,234 A * | 12/1976 | Worman | H01R 13/6335 | 439/456 |
| 5,090,916 A * | 2/1992 | Magnier | H01R 13/26 | 439/299 |
| 6,375,129 B2 * | 4/2002 | Koziol | H02G 3/26 | 174/662 |
| 6,485,316 B1 * | 11/2002 | Chen | H01R 13/6395 | 439/133 |
| 6,683,258 B1 * | 1/2004 | Tracy | F16L 3/137 | 174/135 |
| 6,939,161 B1 * | 9/2005 | Yi | H01R 13/6395 | 439/373 |
| 7,083,438 B2 | 8/2006 | Massaro et al. | | |
| 7,140,903 B2 * | 11/2006 | Pulizzi | H01R 13/5804 | 439/371 |
| 7,243,883 B2 * | 7/2007 | Judd | B60R 16/0215 | 248/74.1 |
| 7,390,201 B1 | 6/2008 | Quinby et al. | | |
| 7,530,824 B2 | 5/2009 | Bolain | | |
| 7,563,113 B2 | 7/2009 | Sheng | | |
| 8,360,804 B1 * | 1/2013 | Meister | H01R 13/6395 | 439/350 |
| 8,613,629 B2 * | 12/2013 | Gong | H01R 13/6395 | 439/371 |
| 8,926,358 B2 * | 1/2015 | Kuo | H01R 13/629 | 439/367 |
| 9,166,337 B2 * | 10/2015 | Boswell | H01R 13/6395 | |
| 2002/0068477 A1 * | 6/2002 | Chen-Chiang | H01R 13/6395 | 439/373 |
| 2003/0008554 A1 * | 1/2003 | Chang | H01R 13/516 | 439/544 |
| 2012/0211609 A1 * | 8/2012 | Mandic | H02G 3/0443 | 248/65 |

* cited by examiner

*Primary Examiner* — Briggitte R Hammond

(57) ABSTRACT

The present invention is a port connector securement device comprising a resting piece, a planar surface, and at least one projection extending from the bottom of the planar surface where the at least one projection rests within at least one slot of an USB port when the port connector securement device is slideably insertable, along with the USB cable into the USB port to ensure that the USB cable cannot be removed upon the port connector securement device insertion into the USB port.

13 Claims, 3 Drawing Sheets

PORT CONNECTOR SECUREMENT DEVICE

FIELD OF THE INVENTION

The present invention relates, in general, to electrical connectors and, more particularly, to a port connector securement device.

BACKGROUND OF THE INVENTION

Various connector types are used to connect computer equipment (e.g. personal computers, laptops, server, hubs, routers, switches, etc.) to other devices. These connectors include an Ethernet connector, an IEEE 1394 connector, a parallel connector, a serial connector, IBM Personal System 2 (PS/2) connector, a Video Graphics Array (VGA) connector, a Digital Visual Interface (DVI) connector, a Small Computer System Interface (SCSI) connector, a Tip Ring Sleeve (TRS) connector, and a Universal Serial Bus (USB) connector. These connectors are used to connect various devices including keyboards, printers, disk drives, portable media players, USB flash drives, and digital cameras to other types of computer equipment.

The socket on a device to which a connector may be connected is commonly referred to as a port. A port on a computer is a known vulnerability due to the extrication of data from the computer or the infiltration of malicious software onto the computer than may occur via the port. Therefore, there is a need for a device that secures a port once a connector at the end of a cable, or flash drive, has been connected to a port of a computer device. The present invention is such a device for a USB port.

U.S. Pat. No. 7,083,438, entitled "LOCKING COVERS FOR CABLE CONNECTORS AND DATA PORTS FOR USE IN DETERRING SNOOPING OF DATA IN DIGITAL DATA PROCESSING SYSTEMS," discloses an L-shaped latch for blocking an open end of a cable. U.S. Pat. No. 7,083,438 is incorporated by reference into the specification of the present invention.

U.S. Pat. No. 7,390,201, entitled "DATA POINT SECURITY LOCK," discloses a plug that is compliant with a connector standard having an aperture to engage a latch in the connector that partially extends through the aperture and locks to the connector. U.S. Pat. No. 7,390,201 is incorporated by reference into the specification of the present invention.

U.S. Pat. No. 7,530,824, entitled "LOCKING SEAL FOR DATA PORTS AND ASSOCIATED METHODS," discloses a one-time use device having a base with side longitudinal slots, a protrusion extending upwardly into the slot, a ramp that slopes upward, and a stop higher than the ramp, where the protrusion prevents the device from being removed intact once inserted into a port. U.S. Pat. No. 7,530,824 is incorporated by reference into the specification of the present invention.

U.S. Pat. No. 7,563,113, entitled "WATERPROOF PLUG FOR DATA PORT OF PORTABLE ELECTRONIC DEVICE," discloses a cover plate, a sealing flange extended from a data port sealing surface of the cover plate, and a water-guiding groove along the sealing flange. U.S. Pat. No. 7,563,113 is incorporated by reference into the specification of the present invention.

SUMMARY OF THE INVENTION

It is an object of the present invention to secure a cable connector, or flash drive, within a USB connector port.

It is another object of the present invention to secure a cable connector, or flash drive, within a USB connector port via a resting piece and a planar surface.

The present invention is a port connector securement device comprised of a resting piece and a planar surface.

DETAILED DESCRIPTION OF THE PREFERRED EMBODIMENT

The present invention is a Universal Serial Bus (USB) port protector.

Figure 1:
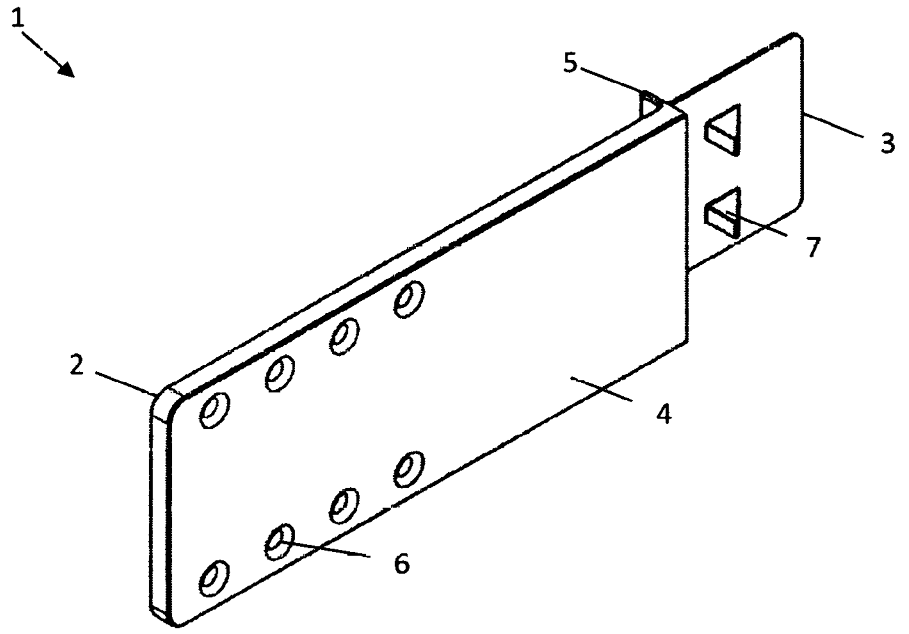
FIG. 1 is a view of the present invention.

FIG. 1 is a top view of the port connector securement device 1 of the present invention.

The port connector securement device 1 is mainly comprised of a resting piece 2 and a planar surface 3. The resting piece 2 includes a rectangular surface 4. The rectangular surface 4 has a user-definable length along an x-axis (going left to right across FIG. 1), a user-definable height along a y-axis (going from the bottom to the top of FIG. 1), a user-definable width along a z-axis (going into FIG. 1), a top, a bottom, a front, and a back having a lip 5. The rectangular surface 4 has a plurality of holes 6 of a user-definable diameter extending from the top of the rectangular surface 4 through the bottom of the rectangular surface 4. The resting piece 2 is comprised of a material selected from the group of materials consisting of plastic, glass, polymer, wood, epoxy, polycarbonate, polyurethane, and acrylic resin.

As indicated above, the port connector securement device 1 also includes a planar surface 3 that abuts said lip of said back of said resting piece. The planar surface 3 has a top, having a bottom, user-definable length along an x-axis (going left to right across FIG. 1), a user-definable height along a y-axis (going from the bottom to the top of FIG. 1), a user-definable width lesser than the user-definable width along the z-axis of said resting piece (going into FIG. 1), and at least one projection 7 extending from the bottom of the planar surface 3. The planar surface 3 can be comprised of a material selected from the group of materials consisting of plastic, glass, polymer, wood, epoxy, polycarbonate, polyurethane, and acrylic resin. In the preferred embodiment, the planar surface has a thickness that ranges between 0.0050-0.0100 inches, so as to occupy the gap that exists at the bottom of a USB port when a USB plug is inserted into the USB port such that the removal of the USB plug from the USB port will indicate evidence of tampering, when USB plug is secured to the port using a wire loop seal.

Figure 2:
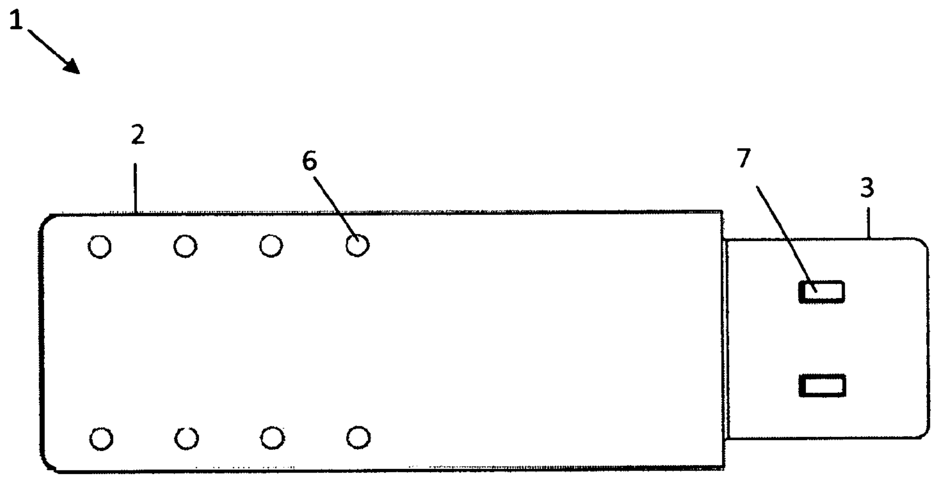
FIG. 2 is a bottom view of the present invention.

FIG. 2 discloses a bottom view of the port connector securement device 1 which depicts the resting piece 2 having a plurality of holes 6 which is adjoined to the planar surface 3 having at least one projection 7.

Figure 3:
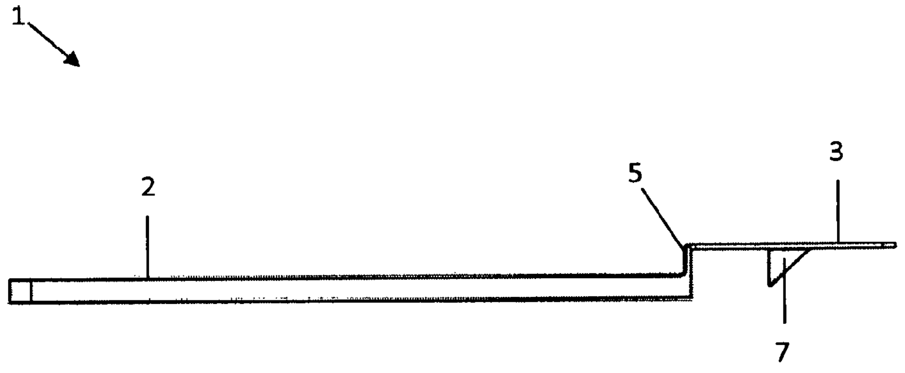
FIG. 3 is a side view of the present invention.

FIG. 3 discloses a side view of the port connector securement device 1 which depicts the resting piece 2 having a lip 5 which is adjoined to the planar surface 3 having at least one projection 7.

Figure 4:
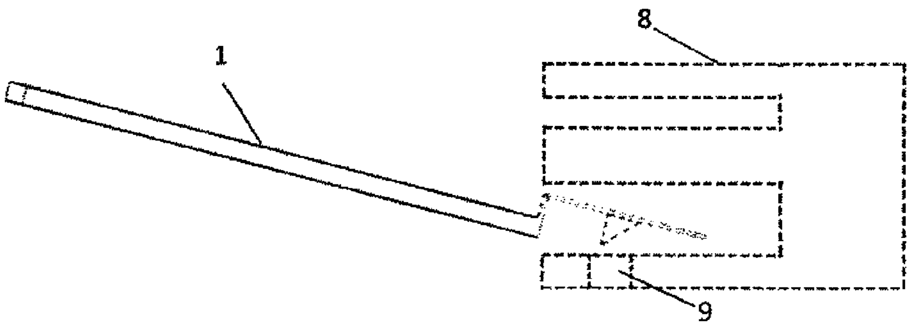
FIGS. 4-6 depict the use of the present invention with a USB port.
Figure 5:
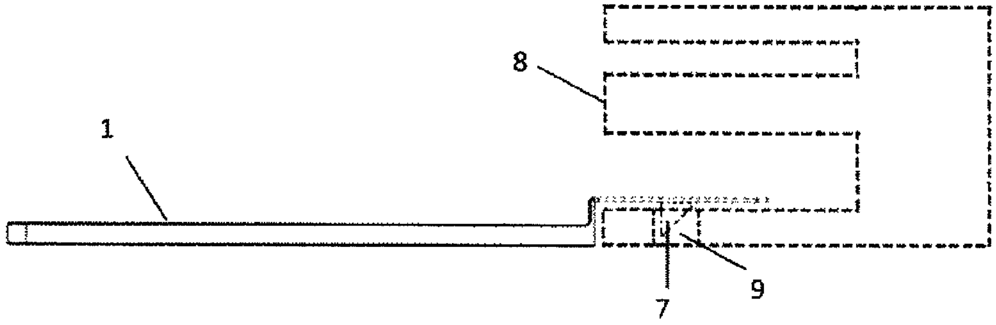
Figure 6:
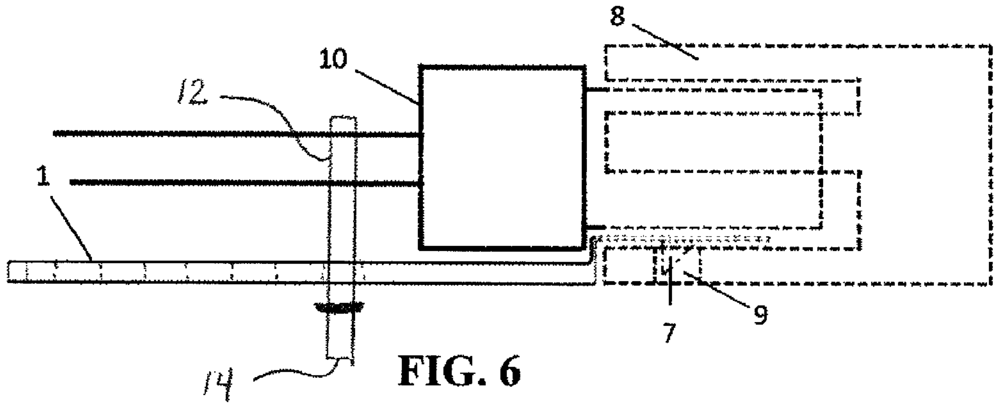

FIG. 4 discloses a side view of the port connector securement device 1 as it is slideably insertable and extractable into and out of an USB port 8. FIG. 5 discloses a side view of the port connector securement device 1 as it is slideably inserted into an USB port 8 such that the at least one projection 7 rests within the at least one slot 9 of the USB port 8. FIG. 6 discloses a side view of the port connector securement device 1 as it is slideably inserted into an USB port 8 such that the at least one projection 7 rests within the at least one slot 9 of the USB port 8. The port connector securement device 1 supports and secures a USB cable 10 that has been slideably inserted into the USB port 8 to ensure that the USB cable 10 cannot be removed without tamper indication.

The port connector securement device 1 further includes a wire 12 having a first end 14 and a second end, where the wire is inserted through the plurality of holes 6 in the resting piece 2 and around the USB cable 10, and where the first end and the second end are securely attached. The wire is comprised of a material selected from the group of materials consisting of copper, steel, nickel, aluminum, plastic, acrylic resin, and polyethylene. The first end and the second end of the wire is secured by a securing method consisting of clasping, welding, soldering, cinching, and sintering.

Although the present embodiments of the invention has been described in detail, it should be understood that a variety of modifications and substitutions, including but not limited to the types of cables and ports used, can be made therein without departing from the spirit and scope of the invention as defined by the claims. Accordingly, the planar surface 3 of the port connector securement device 1 can be modified in terms of thickness, flexibility, and the number of projections such that it will securely fit within any and all slots of any ports that currently exist or are developed in the future.

What is claimed is:

1. A port connector securement device, comprising:

a) a resting piece for supporting a Universal Serial Bus (USB) cable, having a rectangular surface, a user-definable length along an x-axis, a user-definable height along a y-axis, a user-definable width along a z-axis, a top, a bottom, a front, a back having a lip, and a plurality of holes of a user-definable diameter extending from the top of the rectangular surface through the bottom of the rectangular surface; and b) a planar surface that abuts said lip of said back of said resting piece, having a user-definable length along an x-axis, a user-definable height along a y-axis, a user-definable width lesser than said user-definable width along a z-axis of said resting piece, a top, a bottom, and at least one projection extending from the bottom of the planar surface, where the at least one projection rests within at least one slot of an USB port when the port connector securement device is slideably insertable, along with the USB cable into the USB port to ensure that the USB cable cannot be removed upon the port connector securement device insertion into the USB port.

2. The port connector securement device of claim 1, wherein said resting piece is comprised of a material selected from the group of materials consisting of plastic, glass, polymer, wood, epoxy, polycarbonate, polyurethane, and acrylic resin.

3. The port connector securement device of claim 1, wherein said planar surface is comprised of a material selected from the group of materials consisting of plastic, glass, polymer, wood, epoxy, polycarbonate, polyurethane, and acrylic resin.

4. The port connector securement device of claim 1, wherein said planar surface has a thickness that ranges between 0.0050-0.0100 inches.

5. The port connector securement device of claim 1, further including a wire having a first end and a second end, where the wire is inserted through said plurality of holes in the resting piece and around the USB cable, and where the first end and the second end are securely attached.

6. The port connector securement device of claim 5, wherein the wire is comprised of a material selected from the group of materials consisting of copper, steel, nickel, aluminum, plastic, acrylic resin, and polyethylene.

7. The port connector securement device of claim 5, wherein the first end and the second end of the wire is secured by a securing method consisting of clasping, welding, soldering, cinching, and sintering.

8. The port connector securement device of claim 3, further including a wire having a first end and a second end, where the wire is inserted through said plurality of holes in the resting piece and around the USB cable, and where the first end and the second end are securely attached.

9. The port connector securement device of claim 8, wherein the wire is comprised of a material selected from the group of materials consisting of copper, steel, nickel, aluminum, plastic, acrylic resin, and polyethylene.

10. The port connector securement device of claim 8, wherein the first end and the second end of the wire is secured by a securing method consisting of clasping, welding, soldering, cinching, and sintering.

11. The port connector securement device of claim 4, further including a wire having a first end and a second end, where the wire is inserted through said plurality of holes in the resting piece and around the USB cable, and where the first end and the second end are securely attached.

12. The port connector securement device of claim 11, wherein the wire is comprised of a material selected from the group of materials consisting of copper, steel, nickel, aluminum, plastic, acrylic resin, and polyethylene.

13. The port connector securement device of claim 11, wherein the first end and the second end of the wire is secured by a securing method consisting of clasping, welding, soldering, cinching, and sintering.

* * * * *